July 16, 1957  P. C. ROSSIN, JR  2,799,046
CONTINUOUS ROD OR TUBE FORMING PRESS
Filed Feb. 15, 1955  2 Sheets-Sheet 1
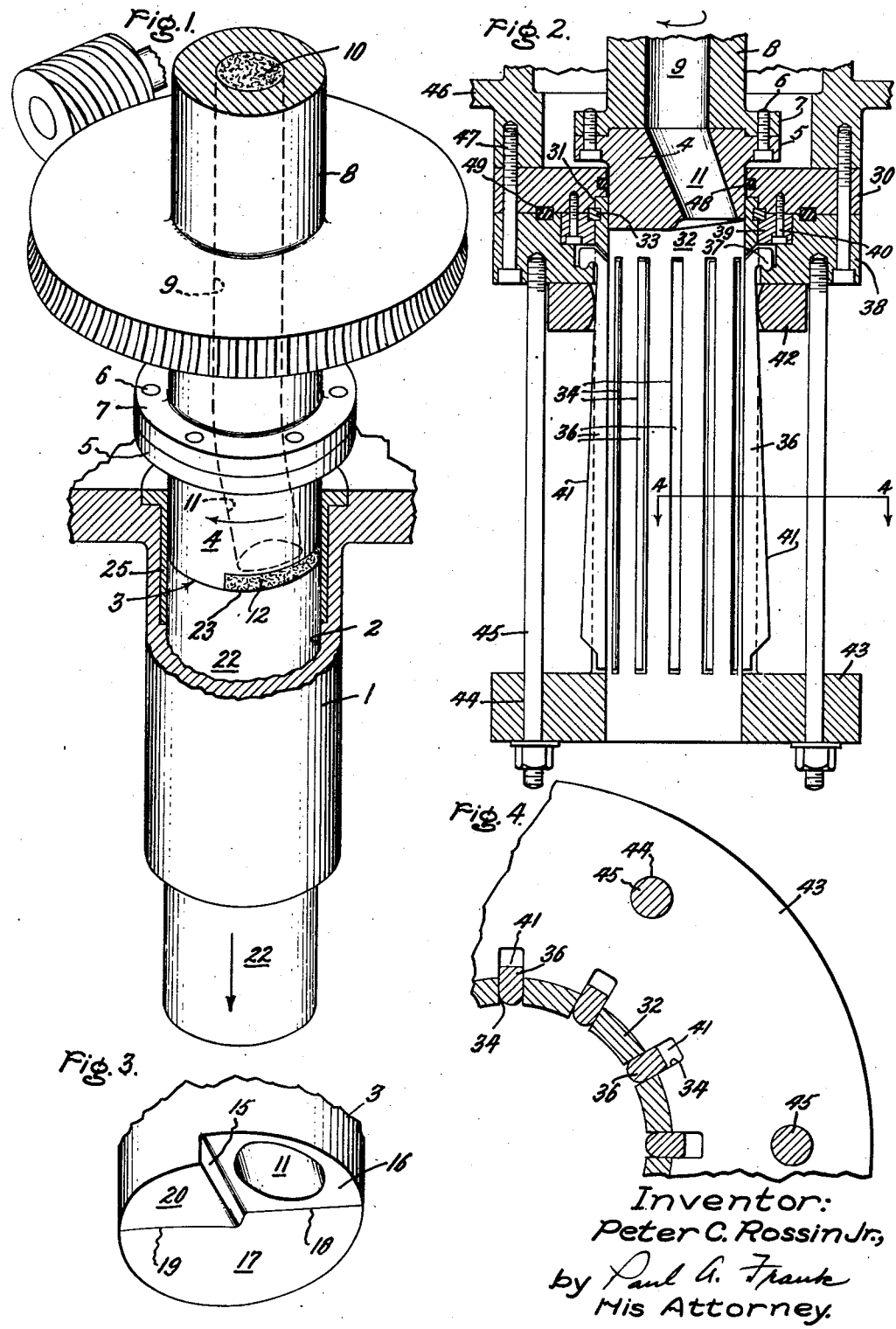
Inventor:
Peter C. Rossin Jr.,
by Paul G. Frank
His Attorney.

July 16, 1957 P. C. ROSSIN, JR 2,799,046
CONTINUOUS ROD OR TUBE FORMING PRESS
Filed Feb. 15, 1955 2 Sheets-Sheet 2
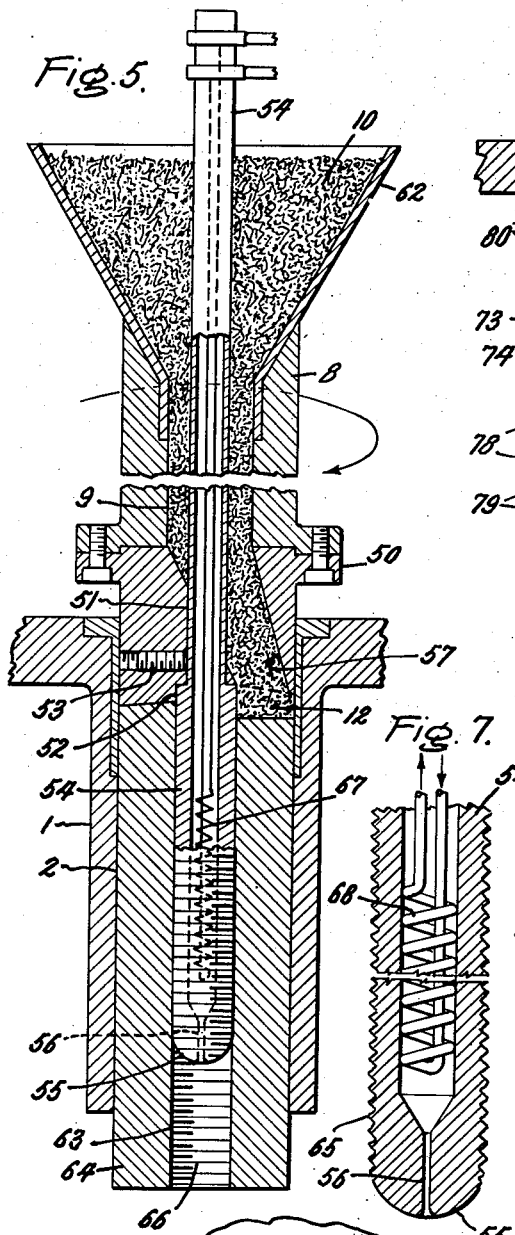
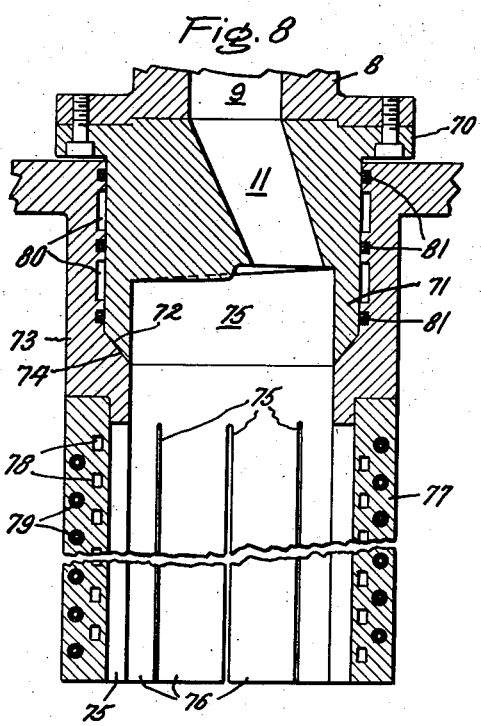
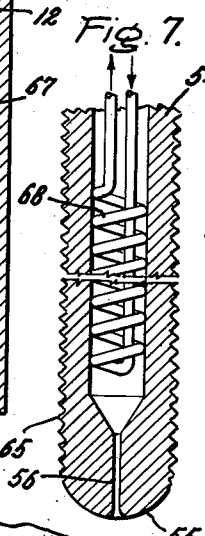
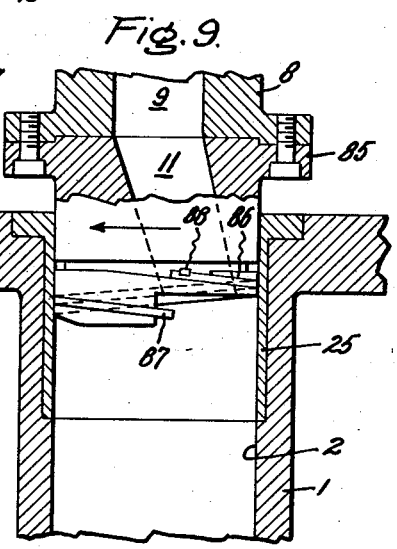
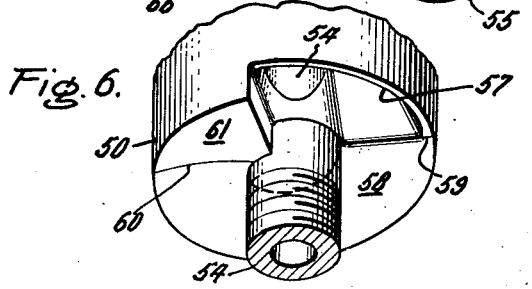
Inventor:
Peter C. Rossin, Jr.,
by Paul A. Frank
His Attorney.

United States Patent Office 2,799,046
Patented July 16, 1957

2,799,046
CONTINUOUS ROD OR TUBE FORMING PRESS

Peter C. Rossin, Jr., Ballston Spa, N. Y., assignor to General Electric Company, a corporation of New York Application February 15, 1955, Serial No. 488,314

17 Claims. (Cl. 18—12)

This invention relates to apparatus for continuously forming a rod or tube and more particularly to apparatus for continuously compacting and mechanically bonding together a pulverulent material to form a rod or tube.

One of the uses contemplated for the apparatus of my invention is in combination with consumable electrode type arc melting furnaces, in which combination the rod or tube continuously formed by the apparatus constitutes a consumable electrode. In furnaces of this type, an arc is maintained between a bath of molten metal and an electrode formed of the metal to be melted. The arc melts the electrode end and the molten metal thus formed is deposited in the bath where it is subsequently cooled and solidified to form an ingot. As the electrode is progressively melted, it is necessary simultaneously to move the electrode bodily toward the surface of the bath in order to maintain the arc, since usually the cross-section of the ingot thus formed is much greater than that of the electrode.

Previous to my invention, it has been customary to preform consumable electrodes in conveniently short lengths provided with threaded or otherwise interengageable end portions. As the electrode is consumed additional lengths may be secured to it and the melting may thus proceed continuously. In addition to the relatively complex and expensive operations necessary to preform electrode sections of this type, handling may damage the threaded ends rendering them useless. Further, if the metal to be melted requires either a controlled atmosphere or a vacuum in the melting chamber, providing and maintaining adequate seals at the electrode entry port presents an additional problem. Other previously known consumable electrodes present similar problems in manufacture and use.

From the foregoing it may be seen that a problem exists in continuously forming and feeding a consumable electrode into the melting zone of a consumable electrode arc furnace. The apparatus of my invention is directed toward the continuous formation of a cylindrical rod or tube from compacted pulverulent material and while it is particularly useful for the continuous formation of a consumable electrode by compacting metallic powder, its usefulness is not limited to the production of that particular article. For example, rods or tubes of raw ceramic may be formed by my apparatus for subsequent firing, and other different uses may be readily conceived.

A principal object of my invention is the provision of apparatus for continuously forming a cylindrical rod-like element from a pulverulent material. A further object of my invention is the provision of apparatus for continuously forming a rigid cylindrical rod-like element by compacting a pulverulent material. A yet further object of my invention is the provision of apparatus for continuously forming a rigid, electrically conductive, cylindrical rod-like element by compacting and substantially pressure welding together particles of metal.

Briefly stated, in accordance with one aspect of my invention I have provided an apparatus whereby a pulverulent material may be continuously fed into and through a compacting member which cooperates with a tubular element to form a cylindrical rod-like member from the pulverulent material. The rod-like member so formed is frictionally engaged by the tubular element which tends to restrain its free motion therethrough and thus permits the compacting member to exert a continuous compressive force upon the pulverulent material and continuously expel the formed rod-like member from the tubular element. While my invention will be particularly disclosed as an electrode forming apparatus, it will occur to those skilled in the art that it has wider applications and fields of utility.

My invention will be better understood from the following description taken in connection with the accompanying drawings and its scope will be pointed out in the appended claims.

In the drawings,

Fig. 1 is an isometric view of an embodiment of my invention with parts broken away for clarity of illustration;

Fig. 2 is a vertical section of another embodiment of my invention;

Fig. 3 is an isometric view of a detail of construction common to both Figs. 1 and 2;

Fig. 4 is a partial cross-section of Fig. 2 taken along line 4—4;

Fig. 5 is a vertical section of an embodiment of my invention similar in many respects to the embodiment illustrated in Fig. 1;

Fig. 6 is an isometric view of a detail of construction illustrated in Fig. 5;

Fig. 7 is a vertical section of a modification of a part of the structure illustrated in Fig. 5;

Fig. 8 is a vertical section of an embodiment of my invention and

Fig. 9 is a vertical section of another embodiment of my invention.

With reference to the drawings and particularly to the apparatus illustrated in Fig. 1, an elongated tubular element 1 is provided with a central passage 2 having a circular cross-section. A compactor element 3 is provided with a cylindrical portion 4 which is rotatably inserted in one end of tubular element 1 and is dimensioned to closely fit and fill the corresponding end portion of cylindrical passage 2 as shown in the drawing. A portion of compactor element 3 which is exterior of the tubular element 1 is provided with a flange 5 which is secured by any convenient means, such as bolts 6, to flange 7 of feed tube 8. Feed tube 8 has a cylindrical configuration and is provided with an axially disposed central passage 9 through which pulverulent material 10 may pass. Compactor element 3 is provided with a skewed inlet passage 11 which provides a passageway therethrough for pulverulent material 10 into a pre-compacting zone shown at 12. The relationship between feed tube 8 and compacting element 3 and passageways 9 and 11 are more clearly illustrated in Fig. 2. Power driven means are provided to rotate feed tube 8 and compactor element 3 with respect to the tubular element 1. In Fig. 1 a conventional worm gear drive has been shown connected to feed tube 8 and it will be understood that compactor element 3 is to be rotated in the direction of the arrow.

The face of the compactor element illustrated in Figs. 1 and 2 is more particularly shown in Fig. 3. As shown in Fig. 3 the working face of compactor 3 is formed in three zones. Skewed passage 11 is located adjacent to the radially disposed step 15 and provides an opening through the sector-shaped surface 16. Surface 16 lies in a plane normal to the axis of rotation of compactor element 3. The compacting surface 17 is in the form of an inclined plane which extends from a point indicated by line 18 to a point indicated by line 19 and subtends an arc of from 180 degrees to 220 degrees. Surface 17 may be canted as well as inclined in that the radial line elements comprising the surface may be inclined to the axis of rotation of element 3 a few degrees greater than 90 degrees so that at any given radial line element, the peripheral portion of surface 17 extends axially beyond the corresponding central portion. A bearing surface 20 extends from line 19 of compacting surface 17 to the step 15. Surface 20 is planar and lies in a plane perpendicular to the axis of rotation of compactor element 3 and parallel to the plane containing surface 16.

In operation a pulverulent material 10 is fed from a source of supply through passages 9 and 11 and emerges and fills the zone 12 under surface 16, which, as a matter of convenience, will be referred to as the pre-compacting zone. Assume tubular element 1 contains a cylindrical rod-like member 22 having a substantially planar portion at its upper end 23 which is subjacent to and in contact with surface 20 of element 3. Further, assume that the dimensions of cylindrical element 22 are such that considerable friction is developed between element 22 and the interior surface of passage 2. The pulverulent material 10 fills the pre-compacting space at 12 and as the compactor element 3 rotates in the direction indicated by the arrow in Fig. 1, the compactor surface 17 compresses and compacts this loose material into a coherent mass. As the compactor element 3 is continuously rotated, pulverulent material 10 is continuously fed into the pre-compacting zone and subsequently is compacted, thereby forming a compacted, coherent body which is forced through tubular element 1 as indicated in Fig. 1.

The compacting force exerted upon the pulverulent material by the compacting surface 17 is a function of the resistance of the rod-like element 22 to motion through tubular element 1. This resistance to motion is the result of friction between the outer surface of element 22 and the inner surface of passage 2.

In compacting certain materials, it has been found to be advantageous to provide passage 2 with a slight taper so that the effective cross-sectional area of passage 2 at its outlet end is slightly smaller than the cross-sectional area of the passage at or adjacent to the pre-compacting zone 12. By this construction, material is initially compacted in the zone adjacent to the pre-compacting zone into a coherent rod-like element having a given cross-sectional area and, as it is continuously propelled through the tubular forming element, this cross-sectional area is continuously reduced, causing the frictional forces between the outer surface of the compacted element and the interior of the tubular passage 2 to be changed. The amount of taper which may be advantageously employed depends upon the compacting characteristics of the material. For example, the taper desirable for apparatus for compacting a material such as titanium sponge is of the order of about 0.04 to 0.08 inch per foot based on the transverse dimension of passage 2. In view of the fact that the provision of such a taper is optional, and if provided, is dimensionally quite small, no attempt has been made to illustrate it in Fig. 1.

In order that a uniform compacting force may be exerted by compacting surface 17 upon the pulverulent material, the inclined surface 17 may be canted as discussed above. However, since the amount of cant in the surface is a matter of only a few degrees, no attempt has been made to illustrate it.

It has been found that friction developed in the area of contact between cylindrical portion 4 of compactor 3 and passage 2, as well as that developed between the pulverulent material 10 and the surface of passage 2 in the compacting zone is quite high. In order to minimize wear and to readily repair damage caused by abrasion to the inner surface of passage 2, a removable hard-ended bushing or insert 25 may be advantageously employed in passage 2, as illustrated in Fig. 1.

As indicated previously, the compactor member 3 and feed tube structure 8 shown in Fig. 2 are identical with that shown in Fig. 1. In the embodiment shown in Fig. 2, however, the tubular element has been modified in order to provide adjustable means whereby frictional engagement of the tubular element with the compacted coherent body may be varied as desired. More particularly, with reference to Fig. 2, a centrally apertured disk-like element 30 is located about the cylindrical portion 4 of compacter element 3 as shown. Element 30 is recessed as shown at 31 to accommodate an end portion of a cylindrical tubular element 32 and a key 33. The interior of the tubular element 32 is a right circular cylinder and is not tapered. The internal dimension of element 32 closely conforms to the external dimension of the cylindrical element 4 of compactor element 3 but permits relative rotation therebetween. Tubular element 32 is provided with a plurality of longitudinally extending slits 34 spaced about its periphery for the accommodation of movable finger elements 36. Elements 36 are each provided at their upper ends with a knuckle-like bearing and supporting structure 37 which engages and is supported by a centrally apertured recessed member 38. The recess in element 38 also accommodates a recessed key-retaining ring 39 which is removably secured as by bolts 40 to disk-like element 30 and engages and retains key 33 which secures tubular element 32 in place. While the finger elements 36 may be adjustably positioned by any appropriate means, I prefer to provide finger elements 36 with inclined cam surfaces 41 which are adapted to be engaged by a ring-like cam actuating element 42 which bears thereagainst. Tubular element 32 is provided at its lower end with an outwardly extending flange element 43 having a plurality of spaced apertures 44 for the accommodation of the rod-like stud elements 45, as shown. The foregoing organization of elements comprising the variable friction tubular element is assembled in place upon a supporting structure 46 by means of bolts or cap screws such as 47 or in any other convenient manner. If desired, conventional elastomer O-ring sealing elements may be provided as shown at 48 and 49.

From the foregoing, it will be apparent that the friction between a cylindrical element of compacted material moving through the tubular element 32 and the finger elements 36 may be varied by selectively positioning the cam actuating element 42 along the tubular element 32. For example, as the ring-like element 42 is moved from the upper position, as illustrated, toward the other end of the tubular element 32, the fingers 36 will be progressively forced into the tube through slots 34 and into a more intimate contact with the outer periphery of the compacted cylindrical element moving through the tube. As the frictional forces increase, the amount of "back loading" upon the compacting surface 17 will be correspondingly increased which will result in a denser, more highly compacted element 22. It is contemplated that ring-like element 42 may be positioned manually or by any other means which would occur to one skilled in the art. Further, it is believed to be obvious that the density or degree of compactness of the produced cylindrical element 22 may be conveniently regulated by automatically positioning ring 42 by any conventional automatic means responsive to the loading variations of an electric motor (used to drive compactor element 3) induced by changes in the "backloading" reaction upon compactor surface 17. For example, as the force required to propel the compacted element increases, the density of the compacted element will be increased and the load on the motor driving the compactor will be increased. This increase in load may be detected and utilized to control means for positioning ring 42 by any of several well known means.

In the embodiment of my invention illustrated in Figs.

5 and 6 the compactor element 50 has been modified to enable the apparatus to produce a tube rather than a solid rod. As illustrated in Fig. 5, the tubular element 1 is identical to that in Fig. 1 and like reference numerals have been applied thereto. It is obvious, of course, that the variable friction tubular element 32 etcetera, illustrated in Fig. 2, might equally well be used in its place, if desired. In addition, the feeding tube structure is identical to that illustrated in Fig. 1 and if desired a worm gear drive as illustrated in Fig. 1 may be employed therewith, or any conventional drive mechanism may be used in order to rotate the compactor element and associated structure in the direction indicated by the arrow.

Compactor element 50 is substantially identical to compactor element 3 in all respects except it is provided with an axially disposed through-passage 51 which is counterbored adjacent to the working surface at 52. Extending through passage 51 and counterbored portion 52 and secured therein by means of a set screw 53 is a tubular mandrel-like element 54 having a rounded lower extremity 55 provided with an axially disposed aperture 56. The working face of compactor element 50 is substantially identical to the working face of compactor 3. As illustrated, passage 57, through which the pulverulent material is fed, is larger than the corresponding passage 11 in compactor element 3. However, this is felt to be a matter of choice, although slightly better results may be obtained with one or the other construction depending upon the characteristics of the particular chosen pulverulent material. Compacting element 50 is provided with a canted inclined plane compacting surface 58 which extends from line 59 to line 60 in a manner similar to the compacting surface 17 of element 3. Surface 61 is planar and lies in a plane perpendicular to the axis of rotation of compactor element 50.

As illustrated pulverulent material 10 is fed from a hopper-like structure 62 through a tubular passageway 9 through a skewed passageway 57 into a pre-compacting zone 12 similar to that illustrated in Fig. 1. As the compactor assembly is rotated in the direction indicated by the arrow the loose material from pre-compacting chamber 12 is engaged by the inclined surface 58 and is compacted and compressed within the tubular element 2 around mandrel 54. In view of the fact that there is a substantially larger frictional area involved in the apparatus illustrated in Fig. 5 compared to that illustrated in Fig. 1 due to the contact of the mandrel-like element 54 with the internal surface of the tubular compacted element 64, the amount of taper provided the interior of tubular element 1 may be substantially reduced. It may further be desirable to provide an external thread 65 on mandrel-like element 54. The pitch of the thread must be such that it will assist in expelling the compacted tube 64. In this respect it will be appreciated that internal passage 63 of element 64 will be formed with an internal thread 66 during the compacting operation and that the relationship between the internally threaded compacted element 64 and the externally threaded mandrel-like element 54 will be similar to that of a nut and lead screw thereby accomplishing the expelling function.

In the operation of the embodiment illustrated in Figs. 5, 6 and 7 it may be found necessary to modify the temperature of that portion of the mandrel 54 at or adjacent to the compacting zone. This may be accomplished in any convenient way. For example, a conventional electrical resistance heating element 67 located within the tubular mandrel 54 as shown in Fig. 5 may be employed to raise the temperature of the mandrel. Alternatively, the mandrel may be provided with a cooling coil 68 as shown in Fig. 7 through which a coolant may be circulated as indicated by the arrows. In the event that a greater degree of temperature control is desired, it is obvious that both a heating element and a cooling coil may be simultaneously employed within mandrel 54 in order to maintain a predetermined temperature.

When the apparatus illustrated in Figs. 5–7 is utilized to continuously form a consumable electrode for an arc melting furnace, it is sometimes desirable to make either continuous or periodic additions to the melting zone. The hollow tubular mandrel 54, having the terminal aperture 56, is useful as a conduit for the introduction of a fluent material to the internal passage 63 formed in the compacted element 64. The fluent material may, for example, be a reactive gas or either a reactive or inert gas carrying a finely divided reactive solid. In the event the apparatus is used to produce articles other than a consumable electrode, the hollow mandrel 54 and duct 56 may conveniently be used to introduce any desired material into the interior of the tubular compacted element 64. In this respect various modifications in the configuration, location and number of ducts 56 will readily occur to one skilled in the art. While a hollow mandrel has been illustrated, of course a solid mandrel may be employed if desired.

In the operation of the apparatus it has been found that under certain circumstances finely divided particles of the pulverulent material 10 may tend to be forced between the outer peripheral surface of the cylindrical portion 4 of the compactor 3 and the interior surface of the passage 2 causing abrasion therebetween. The embodiment illustrated in Fig. 8 provides a compactor element 70 identical in all respects with the compactor element 3 illustrated in Figs. 1–3 except that it is provided with a dependent peripheral skirt 71 having a beveled portion 72. Compactor 70 cooperates with a cylindrical tubular forming element 73 which is provided with a beveled shoulder 74 which cooperates with beveled portion 72 to form a relatively rotatable, tight joint as illustrated. Pulverulent material passing through passageways 9 and 11 is conducted into zone 75 wherein it is compacted. As this compacted material passes the joint between beveled portions 72 and 74 there is a minimum of loose material present which is capable of being forced therein.

Additionally, in Fig. 8 I have illustrated means whereby the degree of taper of tubular element 73 may be thermostatically regulated. The output portion of tubular element 73 is provided with a plurality of longitudinally extending slots 75 spaced about the periphery which define resilient finger-like strips 76 therebetween. While strips 76 may be actuated in any convenient manner, I prefer to employ a collar-like thermally actuated element 77 which encompasses the slotted portion of tubular element 73 and bears thereagainst. Coolant passages 78 and heating element passages 79 are provided in the collar-like element 77. The internal dimension of collar-like element 77 may be varied according to its thermal expansion characteristics. Regulation of its temperature by controlling and balancing the heat input by element 79 against the heat extracted by cooling passages 78 will thereby adjust the degree of taper in tubular element 73 by flexing fingers 76. In a manner similar to that disclosed in connection with the embodiment of Fig. 2, loading variations of the electric motor used to drive the compactor may be utilized to automatically vary the temperature of element 77.

In operation of the apparatus of my invention it has been found desirable to cool the compacting element under certain circumstances. Coolant passageways 80 may conveniently be provided as shown in Fig. 8 and conventional elastomer O-ring seals may be used to prevent leakage as shown at 81.

A still further embodiment of my invention is illustrated in Fig. 9. The apparatus illustrated in Fig. 9 is substantially identical to that illustrated in Fig. 1 except that compactor element 85 is provided with a helical groove 86 which receives a resilient split ring-like element 87. Ring-like element 87 in its unstressed condition has an outer diameter somewhat larger than the inner diameter of tubular element 1. When ring 87 is assembled in groove 86 and the compactor and tubular element 1 are fitted together as illustrated in Fig. 9 the resilent ring 87 provides a seal. Inasmuch as the compactor element 85 is to be rotated in the direction of the arrow, the pitch of groove 86 is such that any pulverulent material which finds its way between the interior of tubular passage 2 and the exterior surface of the cylindrical portion of compactor 85, will be urged by ring element 87 back into the compacting zone. Ring element 87 may be made of any suitable metal or alloy and the upper end is retained in place by any suitable means, such as key 88.

As previously disclosed the apparatus of my invention has particular utility in combination with a consumable electrode arc melting furnace. In particular, it has been found useful for continuously forming titanium sponge into an electrode to be fed into a vacuum or inert gas atmosphere furnace chamber. In this environment the tubular friction element 1 may be formed integrally with the furnace enclosure or attached thereto by means of a hermetic seal. As the titanium sponge is compacted within the tubular element, it forms its own seal by intimate contact with the aperture of the tubular element. The pressure developed during compression is such that upon examination of the compacted structure it is found that the individual particles of titanium sponge have been compressed into a more or less solid mass and each particle appears to be pressure welded to others forming a substantially solid coherent cylinder or tube (as the case may be) of titanium. The electrical conductivity of the compacted mass is good and its physical strength is quite high. Inasmuch as the titanium sponge is supplied from a hopper-like structure which opens into the atmosphere, additional sponge may be added to the hopper as needed, providing for substantially continuous furnace operation for any desired period of time.

It is obvious from inspection of various figures of the drawing that the several modifications and embodiments of the elements of my invention may be interchanged as desired. For example, the compactor element 59 and mandrel 54 of Fig. 5 may be assembled with either the variable friction tubular assembly of Fig. 2 or equally well with the thermally controlled variable taper tube shown in Fig. 8. Other and equally obvious combinations of the several disclosed elements to form an apparatus within the purview of my invention will be apparent to a person skilled in the mechanical arts.

Further, while it is obvious that the rotatable compactor member of my invention and the internal passage of that portion of the tubular element which cooperates therewith must have circular cross-sections, the outlet portion of the passage of the tubular element may, if desired, have a cross-section other than circular to produce tubular or rod-like compacted elements having a corresponding non-circular cross-section.

Additionally, it is to be noted that while the apparatus of my invention has been disclosed as being suitable for continuously producing a compacted rod-like element of an indefinite length, obviously such elements may be produced in finite lengths, if desired.

From the foregoing it is apparent that this invention provides apparatus for continuously forming a coherent rod or tube by compacting pulverulent material within a forming tube and expelling the formed compacted rod or tube from the forming tube. The specific examples set forth in the disclosure are illustrative of the invention, it being understood that various modifications can be made within the true spirit and scope of my invention as defined by the appended claims.

What I claim as new and desire to secure by Letters Patent of the United States is:

1. Apparatus for continuously producing a rod-like coherent body from a pulverulent material comprising a tubular forming element providing a passage having an open end, a substantially cylindrical compactor member substantially filling the other end of the passage and rotatable therein, the inner extremity of the rotatable cylindrical compactor member being provided with a non-planar face comprising a first substantially planar surface contained within a first plane normal to the axis of rotation of the substantially cylindrical compactor member, a second substantially planar surface contained within a second plane parallel to the first plane, the first and second substantially planar surfaces being connected by a radially disposed step comprising a substantially planar surface contained within a plane containing the axis of rotation of the substantially cylindrical compactor member and by an inclined, substantially planar compacting surface, and means for supplying pulverulent material to the interior of the tubular forming element comprising a passage through the substantially cylindrical compactor member, a first portion of said passage extending along and encompassing the axis of rotation of said compactor member and a second portion of said passage in communication with said first portion of said passage and emerging from said compactor body in said second substantially planar surface of said non-planar face between the axis of rotation of said compactor member and the periphery of said non-planar face.

2. Apparatus as recited in claim 1 in which the inclined, substantially planar compacting surface is canted.

3. Apparatus as recited in claim 1 in which the passage in the tubular forming element is provided with means whereby the frictional contact between the passage and a coherent mass moving therethrough varies along the length of the passage.

4. Apparatus as recited in claim 3 in which the means for varying the frictional contact comprises a plurality of longitudinally disposed finger-like elements peripherally arranged about a portion of the tubular forming element and means for selectively positioning the finger-like elements to effectively change the cross-sectional area of a portion of the passage in the tubular forming element.

5. Apparatus as recited in claim 4 in which the finger-like elements are pivotally supported at one end for swinging motion through longitudinally disposed slots in the tubular forming element.

6. Apparatus as recited in claim 5 in which each of the finger-like elements are provided with a cam-like outer surface and in which the means for selectively positioning the finger-like elements comprises a cam actuating element bearing against the cam-like outer surface whereby shifting the position of the cam actuating element causes the finger-like element to move about its pivotal support.

7. Apparatus as recited in claim 4 in which the finger-like elements comprise resilient segments of the wall of the tubular forming element separated by a plurality of longitudinal slits in the wall of the tubular forming element extending from the open outlet end of the tubular forming element toward the cylindrical member.

8. Apparatus as recited in claim 7 in which the finger-like elements are encompassed by a collar-like member which bears thereagainst and means whereby the internal dimension of the collar-like element may be varied to correspondingly vary the position of the resilient finger-like elements and thereby change the cross-sectional area of that portion of the tubular forming element determined by the finger-like elements.

9. Apparatus as recited in claim 1 in which the rotatable cylindrical compactor member is provided with a cylindrical mandrel secured thereto and extending in coaxial relationship from the non-planar face of the compactor member.

10. Apparatus as recited in claim 9 in which the rotatable cylindrical compactor member is provided with an axial passage therethrough and the cylindrical mandrel comprises a tubular element which extends through the axial passage.

11. Apparatus as recited in claim 10 in which temperature modifying means are contained within the tubular mandrel.

12. Apparatus as recited in claim 11 in which the temperature modifying means comprises an electrical heating element.

13. Apparatus as recited in claim 11 in which the temperature modifying means comprises a tubular heat exchanger through which a cooling media is circulated.

14. Apparatus as recited in claim 10 in which the tubular mandrel is provided with an external thread and an aperture in its end portion which is adjacent the open end of the tubular forming element.

15. Apparatus as recited in claim 1 in which the cylindrical compactor member is provided with means which cooperate with the tubular forming element to prevent pulverulent material from entering and lodging between the side surfaces of the cylindrical compactor member and the contiguous portions of the inner surface of the tubular forming element.

16. Apparatus as recited in claim 15 in which the non-planar face of the cylindrical compactor element is provided with a dependent peripheral skirt portion having a beveled end portion, and in which the tubular forming element is provided with a beveled shoulder portion which closely engages the beveled skirt portion and cooperates therewith to provide a close-fitting joint.

17. Apparatus as recited in claim 15 in which the side surface of the cylindrical compacting member is provided with a substantially helical groove therein, a resilient ring-like element located in the groove and resiliently urged against the contiguous wall portion of the tubular forming element and means securing one end of the ring-like element in place in the groove.

References Cited in the file of this patent

UNITED STATES PATENTS

| | | |
|---|---|---|
| 426,470 | Reichelt | Apr. 29, 1890 |
| 2,050,100 | Kopp | Aug. 4, 1936 |
| 2,224,212 | Bowling | Dec. 10, 1940 |
| 2,694,349 | Hjulian | Nov. 16, 1954 |
| 2,713,188 | Garvey | July 19, 1955 |